United States Patent [19]

Shridharani et al.

[11] Patent Number: 5,223,196
[45] Date of Patent: Jun. 29, 1993

[54] PROCESSING OF PIGMENTED NYLON FIBERS USING MODIFIED POLYMERS

[75] Inventors: Ketan G. Shridharani, Camden; Peter R. Witt, Lugoff, both of S.C.; Perry H. Lin; Sundar M. Rao, both of Seaford, Del.

[73] Assignee: E. I. Du Pont de Nemours and Company, Wilmington, Del.

[21] Appl. No.: 616,126

[22] Filed: Nov. 20, 1990

[51] Int. Cl.$^5$ ............................ D01F 1/04; D01F 8/12
[52] U.S. Cl. ............................ 264/78; 8/489; 8/497; 264/210.8; 264/211; 525/432; 528/324; 528/338; 528/339; 528/340; 528/347
[58] Field of Search ............ 264/78, 210.8, 211; 8/489, 497; 525/432; 528/324, 338, 339, 340, 347

[56] References Cited

U.S. PATENT DOCUMENTS

| | | | |
|---|---|---|---|
| 2,252,554 | 8/1941 | Carothers . | |
| 3,039,990 | 6/1962 | Huffman | 528/324 X |
| 3,542,743 | 11/1970 | Flamand | 528/335 |
| 3,565,910 | 2/1971 | Elbert et al. | 524/88 |
| 3,583,949 | 6/1971 | Simons | 528/324 |
| 3,621,089 | 11/1971 | Edgar et al. | 264/211 |
| 3,629,053 | 12/1971 | Kimura et al. | 428/374 |
| 3,640,942 | 2/1972 | Crampsey | 524/538 |
| 3,696,074 | 10/1972 | Tsuda et al. | 528/338 |
| 3,787,373 | 1/1974 | Ridgway et al. | 528/324 |
| 3,824,207 | 7/1974 | Carter et al. . | |
| 3,846,507 | 11/1974 | Thomm et al. | 525/432 |
| 3,926,924 | 12/1975 | Edgar et al. | 528/324 |
| 4,218,509 | 8/1980 | Edgar et al. | 528/339 |
| 4,579,762 | 4/1986 | Ucci | 428/95 |

FOREIGN PATENT DOCUMENTS

| | | |
|---|---|---|
| 658802 | 5/1965 | Belgium . |
| 35051 | 9/1981 | European Pat. Off. . |
| 373655 | 6/1990 | European Pat. Off. . |
| 918637 | 2/1963 | United Kingdom . |
| 1249730 | 10/1971 | United Kingdom . |
| 1526329 | 9/1978 | United Kingdom . |

OTHER PUBLICATIONS

English Translation of European Reference 193,023 (Published Sep. 1986).
English Translation of Japanese Reference 61-63,785 (Published Apr. 1986).
English Translation of Japanese Reference 63-145,415 (Published Jun. 1988).

*Primary Examiner*—Leo B. Tentoni

[57] ABSTRACT

An improved process for melt-spinning a pigmented hexamethylene adipamide fiber from a melt blend of a polymer and a colored pigment wherein the polymer is a random interpolyamide or a block polymer having two different difunctional recurring amide-forming moieties other than those which form hexamethylene adipamide is disclosed along with pigmented hexamethylene adipamide polymer fibers having tenacities greater than 7.5 or even 8 grams per denier.

19 Claims, 2 Drawing Sheets

PROCESSING OF PIGMENTED NYLON FIBERS USING MODIFIED POLYMERS

TECHNICAL FIELD

This invention relates to pigmented nylon fibers made from certain random and/or block polyamides and to methods for reducing the draw tension necessary for orienting melt-spun pigmented nylon fibers.

BACKGROUND OF THE INVENTION

Nylon can be dyed with acid or cationic dyes to give colored yarns which may be used in fabrics or carpets. Recently, yarn producers have begun incorporating colored pigments into nylon yarns to improve their resistance to degrading and fading in ultraviolet light, to give improved resistance to chemicals and noxious fumes and to give permanent coloration which is not removed by washing. While some pigments can be mixed easily into the nylon without adversely affecting the filament spinning operation, most pigments - and particularly organics - cause some difficulties while being mixed into the nylon or in subsequent melt-spinning and drawing operations. In general, organic pigments tend to cross-link nylon, change its viscosity, form spherulites which weaken the fibers, and cause increased draw tension and filament breaks.

Ultraviolet light degrades nylon, and the degradation can be accelerated by the presence of some pigments. To avoid this, copper in various forms is often added to the polymer. The amount of copper which is effective in preventing degradation of the polymer by ultraviolet light also causes poor spinning performance. The combination of pigment and copper is still worse.

European Patent Publication No. 0373655 ("Anton et al."), published Jun. 20, 1990, and incorporated herein by reference, discloses processes for making stain-resistant, pigment-colored fibers with acceptable levels of spinning performance. Those processes involve forming a random nylon copolymer made with up to 4.0 weight percent of a cationic dye additive such as 5-sulfoisophthalic acid or its salts, adding up to 4.5 weight percent of a pigment concentrate to the copolymer, and melt-spinning the pigment/polymer blend. Certain pigments, however, remain very difficult to spin even using the copolymers disclosed therein.

While Anton et al. is directed primarily at pigment-colored fibers useful in carpet applications, there is also a demand for pigmented fibers suitable for use in certain industrial applications such as for parachute fabrics, life-jackets, and industrial sewing thread where high tenacity is required. Here too, however, the presence of pigment has made it difficult to draw the fibers, and consequently insufficient orientation is obtained to achieve tenacity levels greater than 7.5 grams per denier, which is a level that can be attained for non-pigmented nylon yarns.

Ways of reducing the impact of such pigments on nylon spinning and drawing performance would permit the use of a wider selection of colored pigments, both organic and inorganic, would enable fiber producers to offer a complete range of styling colors while reducing product deficiencies and operating difficulties, and would allow for the production of high tenacity pigmented nylon fibers.

SUMMARY OF THE INVENTION

It has now been found that in a process for melt-spinning a pigmented hexamethylene adipamide polymer fiber by the steps of forming a homogenous melt blend of a polyamide and a colored pigment, spinning the blend to form a fiber, and applying tension to the fiber to draw it and thereby increase its orientation, an improvement for decreasing the draw tension necessary to achieve a predetermined degree of draw in the fiber can be obtained by using as the polyamide a random interpolyamide or block polyamide having at least 80 percent by weight polymerized hexamethylene adipamide units and having at least two different recurring difunctional amide-forming moieties other than those which form hexamethylene adipamide, each of said different recurring amide-forming moieties being present in an amount of 0.25 to 10 weight percent of the polyamide and wherein the different amide-forming moieites constituting part of a block are selected from the group consisting of the following radicals: isophthalic, terephthalic, dodecanedioic, 2-methylpentamethylenediamino, and N,N'-dibutyl hexamethylenediamino. (For convenience, these will hereinafter be referred to as the "block-forming moieties".)

In one form of the invention the two recurring amide-forming moieties are incorporated into the polyamide to be spun by polymerizing a blend of nylon 6,6-forming monomers, i.e. hexamethylene diamine and adipic acid or hexamethylene adipate salt, with 0.25 to 10 weight percent each, preferably 0.4 to 7.5 weight percent each, of two or more different difunctional polyamide-forming monomers to produce a random interpolyamide which is a terpolymer or a multi-polymer. For instance, Example 1 hereinafter illustrates a terpolymer formed by the polymerization of nylon 6,6 forming monomers, caprolactam, and sodium 5-sulfoisophthalate.

In an alternate form the two recurring difunctional amide-forming moieties are incorporated into the polyamide by melt-blending nylon 6,6 homopolymer with one or more different polyamides having block-forming moieties in the polyamide chain(s). Under suitable conditions of time and temperature, transamidation occurs and the polyamide chains having the block-forming moieties break into shorter chains which form blocks with the chains of the homopolymer. When two different block-forming moieties are incorporated in the homopolymer in this manner, each being present in an amount of 0.25 to 10 weight percent, the process improvements of this invention are observed. The two different block-forming moieties may be provided by the transamidation of a single polymer such as poly(N,N'-dibutyl hexamethylenedodecamide) or by a copolymer such as that of isophthalic acid and terephthalic acid with hexamethylene diamine, or alternatively by melt-blending the homopolymer with more than one different polyamide, e.g., poly(hexamethylene isophthalamide) and poly(hexamethylene terephthalamide).

In another alternate form a combination of a random interpolyamide and a block polyamide can be made by polymerizing a blend of nylon 6,6-forming monomers with 0.25 to 10 weight percent, preferably 0.4 to 7.5 weight percent of one different difunctional polyamide-forming comonomer to form a random copolyamide. That copolyamide can then be co-melted with a different polyamide having a block-forming moiety in the polyamide chain to form a combined random and block polyamide having at least two different recurring amide-forming moieties other than those which form nylon 6,6. For example, a copolymer can be formed by polymerizing hexamethylene diamine with adipic acid and a small amount of the sodium salt of 5-sulfoisophthalate followed by block polymerization with the isophthalic moiety, the latter being provided by a polyamide such as poly(hexamethylene isophthalamide).

When using different polyamides to form block polyamides, the block-forming polymer(s) to be co-melted with the principal polymer may optionally be present in the form of a concentrate in which the colored pigment has been preliminarily dispersed. This provides a convenient means for introducing different polyamides used to form blocks since concentrates comprised of carriers and other additives are typically used to provide more uniform mixing of the pigment particles within the melt-blend.

The reduction in draw tension achieved with the aforementioned improvements results in process operability which is superior to that obtained when fibers are spun using pigments with nylon homopolymer or random co-polymers thereof. In fact, operability often approaches that of unpigmented nylon homopolymers. In addition, such improvement in processability can be achieved without loss of tensile properties.

In a further embodiment of the invention, the reduction in draw tension which can be obtained using these processes permits sufficient increases in the orientation of pigmented nylon 6,6 fibers to achieve fiber tenacity of 7.5 or even 8.0 grams per denier or more, along with modulus levels of 30-35 grams per denier. Such fiber properties have not previously been readily attainable with pigmented polyamide fibers. Accordingly, this invention also encompasses pigmented hexamethylene adipamide polymer fibers having a tenacity of at least 7.5 grams per denier, preferably of at least 8.0 grams per denier, the fibers being comprised of a polyamide and a colored pigment wherein the polyamide is a random interpolyamide or a block polyamide having at least 80 percent by weight hexamethylene adipamide units and at least two different recurring difunctional amide-forming moieties other than those which form hexamethylene adipamide, each of said different recurring amide-forming moieties being present in an amount of 0.25 to 10 weight percent of the polyamide and wherein amide-forming moieties constituting part of a block are selected from the group consisting of isophthalic, terephthalic, dodecanedioic, 2-methyl pentamethylenediamino, and N,N'di-butyl hexamethylenediamino.

As used herein the term "amide-forming moiety" refers to a diacid, diamine or lactam after removal of the functional end-groups. As also used herein "hexamethylene adipamide units" refers to the nylon 6,6 units formed from two recurring amide-forming moieties, i.e., the hexamethylene diamino moiety, $-(HN-(CH_2)_6-NH)-$ formed from the monomer hexamethylene diamine and the adipic moiety $-(OOC-(CH_2)_4-COO)-$ formed from the monomer adipic acid. The term "interpolyamide" is used generically to refer to random polyamides comprised of two or more different recurring units and consequently having at least three different amide-forming moieties as part of the polymer chain. Such polyamides would include any random polyamide formed by polymerizing the nylon 6,6 forming monomers hexamethylene diamine and adipic acid with one or more different polyamide forming monomers. The term "copolymer" (or "copolyamide") is used to describe polymers (polyamides) having only two different recurring units with each such unit having an amine and an acid moiety. Accordingly copolymers of nylon 6,6 have three different recurring amide-forming moieties. The term "terpolymer" (or "terpolyamide") refers to polymers (polyamides) comprised of three different recurring units, requiring four different amide-forming moieties. An example of a nylon 6,6 terpolymer would be the reaction product of the nylon 6,6 forming monomers with two different comonomers such as isophthalic acid and 2-pentamethylene diamine. The term "multipolymer" (or "multi-polyamide") refers to polymers (polyamides) comprised of more than three different recurring units. The term "block polymer" or "block polyamide" refers to a polymer obtained by co-melting and then further processing together two or more different polymers to form blocks containing the recurring amide-forming moieties of each of the different polymers.

DETAILED DESCRIPTION

Figure 1:
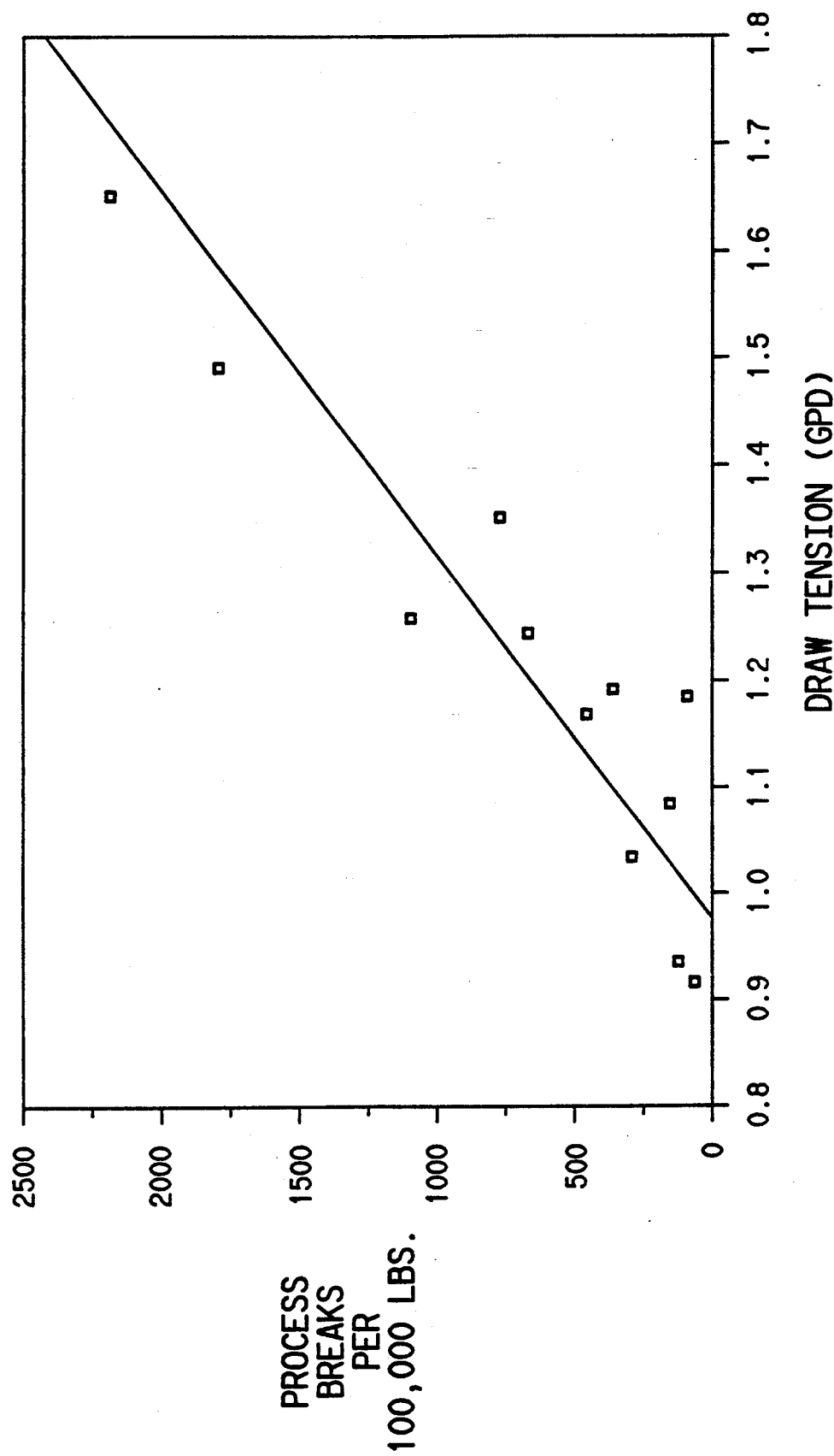
FIG. 1 is a plot of process breaks as a function of draw tension for various fibers made with dark plum and navy pigment concentrates, the best-fit straight line through these data showing the direct relationship between draw tension and process breaks.

The improved processability of these polyamide fibers can be understood by analysis of the conditions under which they are melt-spun and drawn. As will be seen in the discussion below, freshly melt-spun pigmented filaments of nylon 6,6 homopolymer tend to quench more rapidly than non-pigmented filaments. Such rapidly quenching filaments both tend to break during spinning and require more tension to orient the fiber during drawing. In turn, increasing the force on the fiber during drawing results in increased break levels. As shown in the Examples, the pigment-colored random and block polyamides described herein both quench more slowly and require less force to draw, thereby leading to fewer breaks during processing.

The processes of this invention can be used to produce nylon fibers having different degrees of orientation and therefore different tensile properties. As the fiber's orientation increases, its tenacity, for example, is increased. Depending on the tenacity and other fiber properties needed for a given end-use application, the desired degree of orientation is determined. The total mechanical draw necessary to achieve that level of orientation, and hence the desired fiber properties, is then set. The freshly-spun fiber is drawn by tensioning it typically between feed rolls and faster-turning draw rolls, the ratio between the two (draw ratio) being the measure of the draw and the degree of orientation being achieved. If the tension on the fiber is too high as it is being drawn at any given draw ratio, breaks occur and the process is disrupted. It is therefore desirable to reduce the draw tension necessary to achieve a predetermined draw ratio.

Fibers to be used in textile and carpet applications, for example, require comparatively low tensile strength, and the freshly-spun fibers are typically drawn from as little as about 150% for textile yarns to about 250-300% to provide tensile properties (about 3 grams/denier tenacity and about 65% elongation) suitable for carpet fibers.

For industrial applications however, higher tenacity fibers are desirable and consequently more orientation is needed. By reducing the force needed to draw the fibers, higher draw ratios which translate to higher orientation levels—and therefore higher tenacity levels—can be achieved using these processes. By drawing the fibers in the range of 4.5 to 5.5×, pigment-colored polyamide fibers having tenacity levels of at least 7.5 grams per denier can now be melt-spun from compositions of a polyamide and a colored pigment concentrate. A preferred combination for making such fibers involves the nylon 6,6 interpolyamide made from nylon 6,6 salt with caprolactam and either 5-sulfoisophthalic acid or a salt thereof, particularly the sodium salt, as comonomers. A particularly preferred high tenacity black fiber can be spun under commercial conditions from a molten composition of a black pigment concentrate containing the pigments Channel Black (PBK-7) and Indanthrone Blue (PB-60) and a random terpolyamide made from hexamethylene adipate to which has been added about 2-4 weight percent caprolactam and about 1-3 weight percent of the sodium salt of 5-sulfoisophthalic acid. These fibers are useful as woven fabrics for parachute material as well as for high-strength sewing thread and other industrial applications.

Suitable difunctional comonomers which may be used with nylon 6,6 forming monomers to provide the different recurring amide-forming moieties found in the random interpolymers used in this invention include aliphatic and aromatic diacids, aliphatic and aromatic diamines, lactams, and the salts formed using such compounds. Examples of such compounds include, but are not limited to, isophthalic acid, dodecanedioic acid, 2-methyl-1,5-diaminopentane, m-xylyldiamine, 5-sulfoisophthalic acid and its salts, particularly the alkali metal salts, caprolactam, etc. Based on the wide range of comonomers tested and described in further detail in the Examples below, it would appear that although certain comonomers appear to be more effective than others, any combination of comonomers that polymerize well and can be melt-spun with nylon 6,6 forming monomers will at least to some degree assist in counteracting the processing problems introduced by most pigments.

Polyamides useful in forming block polyamides with nylon 6,6 and nylon 6,6 base polymers in order to achieve the process improvements of this invention are those which are capable of providing the specific block-forming moieties discussed previously. Examples of such polyamides include poly(N,N'-dibutyl hexamethylenedodecamide), copolymers of isophthalic acid and terephthalic acid with hexamethylene diamine, and polymers of 2-methyl pentamethylenediamine with isophthalic, terephthalic, dodecanedioic acids, or combinations thereof. Particularly good results have been obtained by melt-blending nylon 6,6 base polymers with poly(N,N'-dibutyl hexamethylenedodecamide) and with isophthalic acid/terephthalic acid copolyamides. The nylon 6,6 base polymers may be either nylon 6,6 homopolymer or copolymers having at least 80 percent by weight hexamethylene adipamide units, a preferred copolymer being the random nylon 6,6 copolymer of hexamethylene adipamide and up to 4 weight percent of the sodium salt of 5-sulfoisophthalate.

Such melt-blend block polyamides require at least about 0.25 weight percent of each amide-forming moiety constituting a block, depending on the respective polyamides used. In general, however, the amount of a compound required to modify the base polymer sufficiently to obtain improved spinning performance will be greater when forming a melt-blend block polyamide than that required when using random ter- or multi-interpolyamides described above. The precise amount of an amide-forming moiety required within the 0.25 to 10 weight percent range will depend on the specific polyamides and the pigment involved, and on the amount of improvement desired.

The block polymers are formed by melt-blending two or more polyamides under conditions of time and temperature suitable for a transamidation reaction (i.e. an amide interchange) between the different polymer chains to occur. The time and temperature can be adjusted to obtain varying degrees of block formation, but typical melt-spinning conditions are generally sufficient for some degree of block formation to occur.

While 10 weight percent of the different recurring amide-forming moieties appears to be a practical upper limit, in some cases amounts greater than 10 weight percent can be expected to provide improved process performance as well, though the fiber will begin to lose the characteristics of the base polyamide involved. Accordingly the upper limit for each of the recurring amide-forming moieties appears to be constrained only by cost considerations and end use performance requirements.

The pigmented yarns made by processes of this invention may be made with a wide range of both organic and inorganic pigments which are generally introduced in the form of a concentrate formulation containing one or more pigments, the number, color, and proportion of which are based on the final color shade desired, and other materials including one or more known polyamide carriers, such as nylon 6 and the terpolymer of nylon 6/6,6/6,10 (46/34/20%), as well as lubricants and other polymeric additives.

Among the colored pigments which can be effectively utilized in polyamide fibers using the processes described herein are those shown in Table A below such as Phthalo Blue (PB-15:2), Perylene Red (PR-179), Indanthrone Blue (PB-60), Phthalo Green (PG-36), Yellow Chromium Complex (SY-21), and those of the Carbon Black (PBK-7) family such as Lamp Black, Furnace Black, or Channel Black. Others include Phthalo Blue R/S (PB-15:1), Antimony-Chromium-Titanium Complex (PB-24), Iron Oxide YS and Iron Oxide BS (PR-101), Diazo Anthroquinone (PR-177), Cobalt Blue (PB-28), Carbazole Violet (PY-23), Filamid Red 3B (SR-226), Phthalo Blue G/S (PB-16), and Zinc Ferrite (PY-119). All of these pigments can be used either singly or in combinations with one another. As used herein the term "colored pigments" is intended to exclude white pigments such as titanium dioxide which have long been used in small quantities to deluster nylon.

It should be noted that reduced draw tension is also observed when spinning polyamide fibers from the random and block polyamides described herein even when using colored pigments which do not create particularly difficult spinning problems with nylon 6,6 homo- or copolymers. Examples of such pigments include the iron oxide pigments mentioned above.

In addition to their use in making fibers, the pigment-colored random and block polyamides described herein may also be useful in a wide variety of non-fiber applications including, for example, films and blow-molded products.

The choice of the comonomers or additive polymers used to achieve the processing advantages of the invention will be determined in part by the intended end-use of the polyamide fiber. For example, to improve stain-resistance of a fiber or other product produced from the polyamide, Anton et al disclose that from 0.5–4.0 weight percent of a cationic dye additive such as the sodium salt of 5-sulfoisophthalic acid can be copolymerized with nylon 6,6 or 6. Accordingly, if stain-resistant fibers are desired, such cationic dye additives would logically be selected to provide one of the different recurring amide moieties. However, where use of such an additive may not be desirable in the final product, such as in end uses where a high degree of acid dyeability is needed (e.g., acid dye over-printing of fabric or carpet or for differentiation with a fiber product which is acid dye stain-resistant), alternative comonomers or additive polymers would logically be selected.

POLYMER FORMATION

The homopolymers and random interpolyamides used herein can be prepared by a variety of polymerization techniques, but condensation polymerization is the preferred method. A particularly convenient method used for making the random interpolyamides described in this invention is to provide two or more aqueous salt solutions, one being the nylon 6,6 precursor hexamethylene adipate and the other(s) being precursor(s) for the different recurring unit(s) to be incorporated into the nylon 6,6 polymer chain. Such other salt solutions of the comonomers being used to modify the nylon 6,6 polymer are frequently formed from the modifying comonomer and a balancing amount of a nylon 6,6 monomer. For example, when forming a nylon 6,6 copolymer with isophthalic acid or with a sulfonated isophthalic acid, the salt would be balanced with an equimolar amount of hexamethylene diamine. Similarly, when forming a nylon 6,6 copolymer with 2-pentamethylene diamine, the additive salt would be balanced with an equimolar amount of adipic acid. Alternatively, two different amide-forming moieties can be provided by the same salt, tha salt being formed, for example, by equal molar quantities of isophthalic acid and 2-methyl-pentamethylene diamine. Suitable quantities of different salt solutions can be mixed to produce a composite salt solution for the desired final polymer composition. Alternatively, the nylon 6,6-forming monomers and the modifying comonomers used to form the different recurring units of the random interpolyamide can be added in "neat" rather than salt form, before or during the polymerization process.

The condensation polymerization can be carried out in a batch or continuous reactor. It is usually desirable to add various additives for process control. A variety of catalysts are known for use in polymerizing nylon 6,6 homopolymer such as phenyl phosphonic acid, manganese hypophosphite, etc., and these have been found to be useful in polymerization of random interpolyamides described herein. Similarly, a variety of antifoam agents can be used to control the foaming in the reaction vessel(s). If desired, other additives can also be added to meet specific end-use requirements.

The salt solution with desired additives is reacted in a suitable reactor vessel, such as an autoclave, under an inert atmosphere. The salt solution is heated to a temperature between 175° and 200° C. while increasing pressure to about 300 PSIA to minimize loss of volatile organic compounds such as hexamethylene diamine. This typically takes about an hour and allows formation of oligomers. The temperature is then increased to between 250° and 275° C. depending on the polymer composition. The pressure is then released at a slow rate to bleed off steam and to drive the reaction toward polymerization. While maintaining approximately the same temperature, the reaction mixture is held at a low constant pressure for a sufficient time to obtain the desired extent of reaction. The polyamide is then extruded from the reaction vessel and conveniently chopped and dried to produce flake. The relative viscosity (RV) of nylon 6,6 interpolymers from the autoclave (as measured with a formic acid solution) can be in the range of 15 to 80, but is generally between 20 and 55.

The polyamide flake thus produced can be spun at the RV it is produced, or it can be further polymerized to a higher RV by conventional solid phase polymerization processes (such as by removing water under an inert gas at controlled temperature and humidity). Alternatively, the RV may also be increased by other means such as by venting off water as the polymer is melted in the extruder prior to spinning.

It is possible to add any various known additives such as delustrants, antioxidants, and even pigments, to the polyamide at a suitable point in the polymer preparation. It is preferred, however, to add the pigment to the polymer flake as the flake is melted in an extruder in advance of spinning. This is the preferred method of pigment addition since it results in good dispersion, avoids contamination of the autoclave vessel with pigment, and reduces degradation of both the pigment and the polymer.

Spinning

The polymers used in this invention are typically melted in flake form in an extruder, preferably of the screw melter type. Colored pigment, typically dispersed as a concentrate in a polymeric carrier, is co-fed to the extruder where it is co-melted to provide a homogeneous melt-blend. Polyamides made from the block-forming moieties previously described may be used in place of or in addition to the conventional pigment carriers to provide the moieties used to make the block polyamides useful in this invention. Alternatively, such moieties may be provided in the form of different polyamides separately fed into the extruder along with the pigment and the primary nylon 6,6 homopolymer or copolymer flake. See Examples 24–25 hereinafter.

Following formation of the homogeneous melt-blend, the pigmented polymer melt is typically pumped through a transfer line to a spinneret, and spun through the spinneret orifices into a quench chimney to form filaments which are cooled to a non-tacky state by a cross-flow of air. The filaments are pulled through the quench zone by a feeder roll and are withdrawn from the chimney through a steam-conditioner tube. The filaments are then drawn to increase their orientation. Various drawing techniques are known, including the coupled spin-draw process as described in U.S. Pat. No.

4,612,150 (DeHowitt) or the two stage draw process described in U.S. Pat. 3,311,691 (Good).

EXAMPLES

The following examples are offered for the purposes of illustrating the invention and are not intended to be limiting. Percentages are by weight unless otherwise indicated. The test methods which follow were used for obtaining the results described herein.

DESCRIPTION OF TEST METHODS

Formic acid *relative viscosity* (RV) of the polyamides is measured as described at column 2, lines 42–51 in Jennings, U.S. Pat. No. 4,702,875.

Amine and carboxyl ends are determined by the methods described on pages 293 and 294 in Volume 17 of the "Encyclopedia of Industrial Chemical Analysis" published by John Wiley & Sons, Inc. (1973).

Denier of the yarn is measured according to ASTM Designation D-1907-80.

Tensile Properties (Tenacity, Modulus, and Elongation) are measured as described by Li in U.S. Pat. No 4,521,484 at column 2, line 61 to column 3, line 1.

Quench Area—Yarn speeds are measured in the quench chimney at several points on the threadline at various distances from the spinneret. Customarily speeds are measured at twelve locations, starting 9 inches below the spinneret and ending 55 inches below it. Three or four threadlines are measured, and the average speeds at each location are calculated. A graph of yarn speed vs. location is plotted, a curve is fitted to the data, and the area under the curve is then determined. A high value for Quench Area, i.e. a high value for the area under the curve, correlates with a high potential for poor spinning operability.

Draw Tension is the tension needed to get a predetermined degree of draw in the fiber. It is measured in the draw zone, while the yarn is being drawn, using a handheld tensiometer model number TR 2000 from Tensitron, Inc., Harvard, Mass. Three to four threadlines are measured, and the average draw tension is recorded. Draw ratio, throughput, and yarn temperature will affect the measurement, and must be kept constant while draw tension is being measured.

Draw Ratio is an indication of the degree the yarn is being drawn, calculated by dividing the draw roll speed by the feed roll speed. In the case of a two-stage draw process wherein there are two draw rolls, the draw roll speed is that of the second draw roll.

Draw Ratio at Break (DRB) is determined by increasing the draw ratio of the yarn until the yarn breaks every time it is wrapped around the draw rolls. A low DRB indicates that the yarn cannot be fully oriented without breaking, and is therefore an indicator of poor spinning/drawing performance.

Actual % Draw Tension Effectiveness (% $DTE_{act}$) is the reduction obtained in draw tension per weight percent of the non-nylon 6,6 amide-forming moieties in the random interpolyamide. It is calculated by the equation:

$$\% \ DTE_{act} = \frac{(DT)_{HP} - (DT)_{MP}}{(DT)_{HP} - (DT)_{NP}} \times \frac{100}{\text{Wt. \% Additive}}$$

where:

$(DT)_{HP}$=Draw Tension of Nylon 6,6 With Pigment $(DT)_{MP}$=Draw Tension of Modified Polymer with Pigment $(DT)_{NP}$=Draw Tension of Non-Pigmented Nylon 6,6 and Wt % Additive=The total wt % of non-nylon 6,6 amide-forming moieties in the interpolyamide

EXAMPLES 1-5

Control 1, described in Table B, was prepared by polymerizing hexamethylene adipamide salt of 8.2±0.1 pH by removing water through the conventional condensation polymerization process described above, and then cutting the polymer into flake. The standard nylon 6,6 flake produced had —$NH_2$ ends of 59 equivalents/$10^6$ g polymer and a formic acid relative viscosity (RV) of 41. This polymer was then further polymerized via the solid phase polymerization process, melted using a screw melter, spun and drawn in a coupled process using a draw ratio of 270%, and bulked to form a 1245-denier, 19 dpf product. No pigment was added in Control 1.

Various process and product characterization techniques were used to establish the base line conditions. For example, the velocity (yards/minute) profile of the filaments was measured in the quench zone as a function of distance from the spinneret and the area under this curve is reported in Column 4 of Table B. The force required to draw the fiber as well as the number of quality-related process breaks (QB) per hundred thousand pounds of spun fiber were measured as reported in columns 5 and 9 respectively. These are typical values for a nylon 6,6 process without any pigment.

Control 2 is the same nylon 6,6 polymer, but dark plum pigment concentrate having the composition described in Table A was added at the screw melter at a rate of 1.98% on weight of the fiber and homogeneously blended into the polymer melt. The polymer conditions were adjusted to the same melt viscosity as Control 1, which is measured as the pressure drop in the transfer line to the spinneret. Both quench area and force to draw (draw tension) increased significantly, 31% and 84% respectively. This observation is consistent with the hypothesis that the pigment interacts with the nylon and substantially changes the quench rate which, in turn, leads to higher draw tension. This change is dramatic enough that the yarn feels brittle. However, the major impact is on spinning performance where the process breaks increased substantially (column 9), depressing the yield to less than 40%.

For Controls 3 and 4 respectively, 5% nylon 6 and 2% sodium 5-sulfoisophthalate copolymers of nylon 6,6 were prepared by blending hexamethylene adipate salt with caprolactam (Control 3) and with a salt formed from equimolar quantities of sodium 5-sulfoisophthalate and hexamethylene diamine (Control 4), polymerizing each of the two blends, and cutting the polymers into flake. These modified polymers each had 66 parts per million of copper added as cupric acetate prior to polymerization. The RV and —$NH_2$ ends were 37 and 64 for Control 3 and 30 and 57 for Control 4 respectively. Under similar melt viscosity as Control 1 and with dark plum pigment, significant reductions in quench area, draw tension and breaks were observed, but still these values were significantly higher than Control 1, indicating that the effect of the nylon-pigment interaction is not completely eliminated. The % $DTE_{act}$ clearly indicates the superiority of the sodium 5-sulfoisophthalate moiety over that of caprolactam in terms of reducing draw tension.

The use of a higher level of sodium 5-sulfoisophthalate in the nylon 6,6 copolymer further reduces draw tension, quench area, and quality breaks as shown in Controls 5 and 6. However, the polymer casting process and gel formation are a concern with this polymer. In addition, the % draw tension effectiveness reduces as higher levels of this additive are employed.

In Control 7, a nylon 6,6 copolymer with 1.84% of isophthalic acid was prepared by blending hexamethylene adipamide salt and hexamethylene isophthalamide salt, then polymerizing under standard conditions, and casting into flake. This polymer contained normal additives including 66 parts per million copper, added as cupric acetate. As shown in Table B the % draw tension effectiveness per percent of the comonomer is significantly higher than for isophthalic acid than for caprolactam, but significantly lower than sodium 5-sulfoisophthalate.

Example 1 is a random terpolymer of nylon 6,6, 3 wt % polymerized units of caprolactam, and 2 wt % polymerized units of sodium 5-sulfoisophthalate made by blending ingredients in salt form and then polymerizing as described previously. The fiber was made with dark plum pigment under identical conditions as Controls 5-7. Surprisingly, the draw tension, the quench area, and quality breaks are significantly reduced, almost returning to the levels of non-pigmented yarn, Control 1. That is, the nylon-pigment interaction effect is almost eliminated. Even more surprising is the fact that a minor change in polymer composition effected by blending the nylon 6,6-forming monomers with comonomers which form two different recurring difunctional amide units other than the primary hexamethylene adipamide units improves the effectiveness of the process by reducing draw tension, quench area, and process breaks beyond expectations. The synergistic effect of the two different recurring units can be seen by calculating the expected % DTE shown in column 7 of Table B. Based on the % $DTE_{act}$ for Controls 3 and 4, it would be expected that each percent of caprolactam would reduce the draw tension by 7.8% and that each percent of sodium 5-sulfoisophthalate would reduce the draw tension by 25.9%. The expected % DTE per percent of additive for the polymer of Example 1 would therefore be $$[3(7.8)+2(25.9)]/5 = 15.04\%$$

Since the % $DTE_{act}$ for the interpolyamide of Example 1 is 19.04, a 26.3% synergistic effect is achieved with this particular random terpolymer.

The random terpolymers of Examples 1A-5 were made in an identical manner to that of Example 1 except that quantities and types of amide-forming comonomers used to make the polymers were varied as shown in column 3 of Table B. By comparing Example 1A with Example 1 it can be seen that increasing the level of caprolactam in the random terpolymer from 3% to 5%, while still reducing the draw tension as compared to Controls 2 and 3, does not offer any further advantage.

Significant synergism was also observed in the random terpolymer of Example 2 containing 3% caprolactam and 3% sodium 5-sulfoisophthalate, and both quench area as well as process breaks were low compared to the various controls.

Similar synergistic effects were observed with the random terpolymers containing isophthalic acid and caprolactam (Example 3) and isophthalic acid and sodium 5-sulfoisophthalate (Example 4), and process breaks were significantly reduced. Examples 4 and 5 were run with a different pigment concentrate (navy) than the previous examples and controls (dark plum). Due to the similarities observed between the two colors, values for the dark plum controls were used to calculate the expected % DTE and synergism shown in Table B for these examples.

Figure 2:
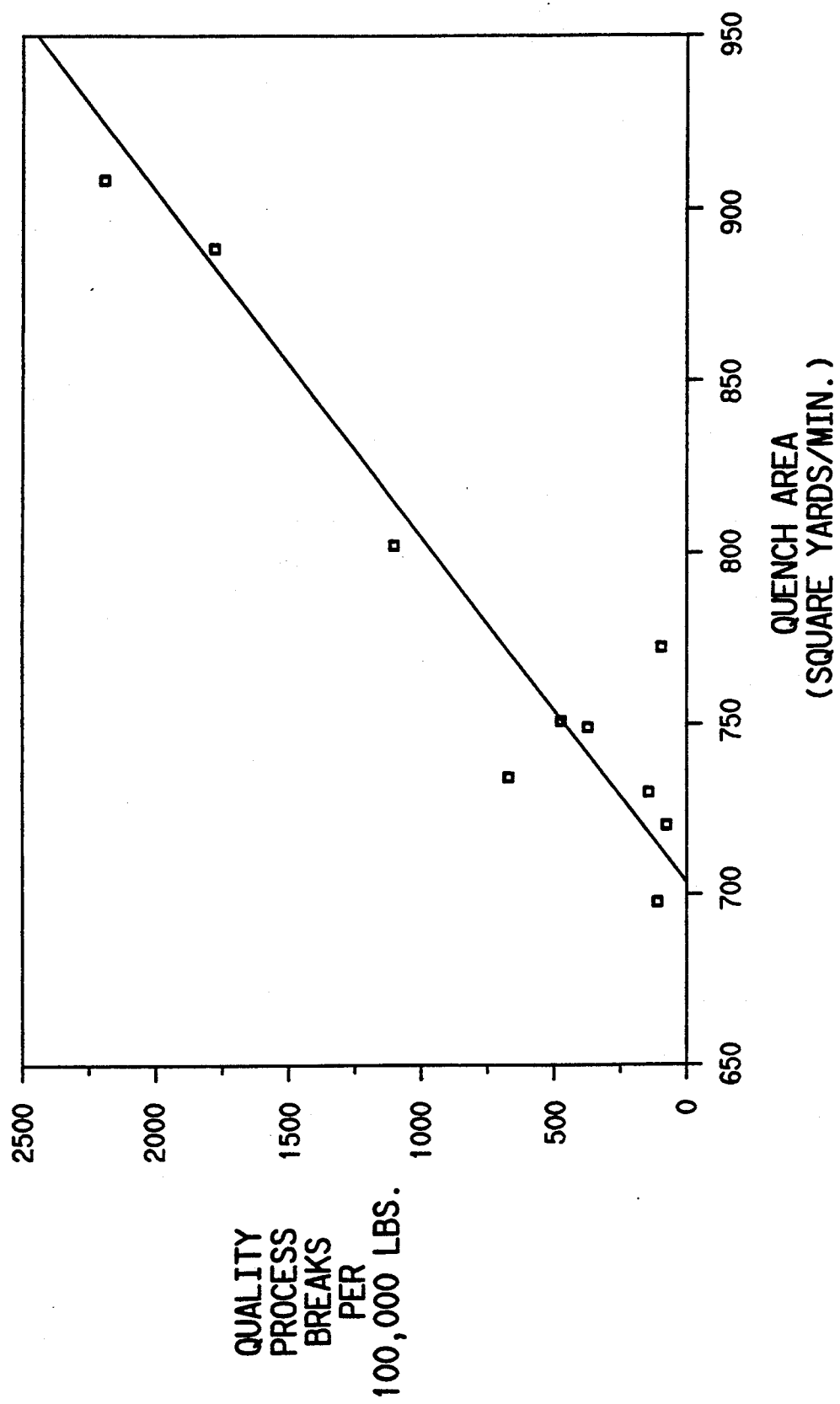
FIG. 2 is a plot of process breaks as a function of quench area for various fibers made with dark plum and navy pigment concentrates, the best-fit straight line through these data showing the direct relationship between quench area and process breaks.

FIGS. 1 and 2, respectively, plot the relationships between draw tension and quench area with process breaks for the data shown on Table B. It can clearly be seen that the draw tension and quench area measurements correlate well with process breaks. These process characterization techniques can be used very effectively in determining the effectiveness of a modified polymer in reducing nylon-pigment interaction, and hence, its effectiveness in reducing process breaks. Use of such techniques allows one to significantly reduce the development cost and time, for example, of developing new polymers, new spinning processes, or even new pigments. For the same reasons, these techniques were used in subsequent Examples as discussed below.

TABLE A

| Color | Total Pigment Concentrate (wt % of fiber) | Concentratte Components (wt % of Fiber) | | | | | | | |
|---|---|---|---|---|---|---|---|---|---|
| | | Nylon 6 | Nylon 6/6, 6/6, 10 Terpolymer | Lubricant | Carbon Black | Anatase TiO2 | Pigment 1 | Pigment 2 | Other Additives |
| Dark Plum | 1.98 | 0.99 | 0.36 | 0.07 | 0.03 | | 0.12 | 0.290 | 0.12 |
| Navy | 2.06 | 1.03 | 0.37 | 0.07 | 0.03 | | 0.27 | 0.160 | 0.12 |
| Electric Blue | 4.97 | 3.58 | 0.75 | 0.05 | | 0.12 | 0.33 | 0.150 | |
| Mint | 2.00 | 1.28 | 0.27 | 0.03 | | | 0.30 | 0.030 | 0.09 |
| Black | 1.85 | 0.92 | 0.37 | 0.05 | | | 0.46 | 0.005 | 0.05 |

| Color | Pigment 1 | Pigment 2 |
|---|---|---|
| Dark Plum | Phthalo Blue (PB-15:2) | Perylene Red (PR-179) |
| Navy | Phthalo Blue (PB-15:2) | Perylene Red (PR-179) |
| Electric Blue | Phthalo Blue (PB-15:2) | Indanthrone Blue (PB-60) |
| Mint | Phthalo Green (PG-36) | Yellow Chromium Complex (SY-21) |
| Black | Carbon Black (PBK-7 | Indanthrone Blue (PB-60) |

TABLE B

| Item | Pigment Concentrate | Polymer (wt % additives) | Quench Area (sq yds/min) | Draw Tension (gpd) | % DTE Actual | % DTE Expected | Synergism (%) | Quality Breaks/ 100,000 lbs |
|---|---|---|---|---|---|---|---|---|
| Control 1 | None | 6, 6 | 694.50 | 0.894 | | | | 100 |

TABLE B-continued

| Item | Pigment Concentrate | Polymer (wt % additives) | Quench Area (sq yds/min) | Draw Tension (gpd) | % DTE Actual | % DTE Expected | Synergism (%) | Quality Breaks/ 100,000 lbs |
| --- | --- | --- | --- | --- | --- | --- | --- | --- |
| Control 2 | Dark Plum | 6, 6 | 911.11 | 1.647 | | | | >2200 |
| Control 3 | Dark Plum | 6, 6/A(5.0) | N/A | 1.352 | 7.8 | | | 800 |
| Control 4 | Dark Plum | 6, 6/B(2.0) | 800.89 | 1.256 | 25.9 | | | 1124 |
| Control 5 | Dark Plum | 6, 6/B(3.0) | 749.83 | 1.191 | 20.2 | | | 370 |
| Control 6 | Dark Plum | 6, 6/B(4.0) | 729.17 | 1.089 | 18.5 | | | 159 |
| Control 7 | Dark Plum | 6, 6/C(1.8) | 888.69 | 1.491 | 11.3 | | | 1800 |
| Example 1 | Dark Plum | 6, 6A(3.0)/B(2.0) | 698.42 | 0.930 | 19 | 15 | 26.7 | 134 |
| Example 1A | Dark Plum | 6, 6/A(5.0)/B(2.0) | N/A | 1.035 | 11.6 | 13 | −10.8 | 300 |
| Example 2 | Dark Plum | 6, 6/A(3.0)/B(3.0) | 716.89 | 0.913 | 16.2 | 14 | 15.7 | 85 |
| Example 3 | Dark Plum | 6, 6/A(3.0)/C(2.0) | 750.44 | 1.175 | 12.5 | 9.2 | 35.9 | 486 |
| Example 4 | Navy | 6, 6/B(2.0)/C(1.0) | 769.19 | 1.185 | 22 | 21 | 4.8 | 100 |
| Example 5 | Navy | 6, 6/A(1.0)/B(2.0) | 729.92 | 1.245 | 17.8 | 19.9 | −10.6 | 700 |

Additives
A = Caprolactam
B = Sodium 5-sulfoisophthalate
C = Isophthalic Acid

EXAMPLES 6-9

For this series of Examples a variety of modified random interpolyamides were prepared by blending salts of hexamethylene adipamide and various comonomers to produce co-, ter-, and multipolymer matrices by condensation polymerization under comparable process conditions to those described previously. These polymers were then converted to flake and further polymerized by solid phase polymerization reaction as described earlier. The dark plum pigment described in Table A was introduced into each polymer before the screw melter except the pigment concentrate addition rate was kept constant for all polymers at 2.25 wt % of fiber, instead of 1.98 wt % of fiber as described in Table A. No pigment was added in Control 8. When transitioning from one polymer type to another polymer type, minor adjustments on solid phase polymerization conditions were necessary to obtain the same melt viscosity as measured by the pressure drop in the polymer transfer line from the screw melter to the polymer manifold before the spinning pack.

These polymers were then each extruded through a spinneret and spun, drawn at a draw ratio of 260%, and bulked to form a 1140 denier, square, 4 hole hollow filament 17 dpf fiber product using a typical coupled spinning machine and spinning conditions described earlier. Characterization techniques described earlier, like draw tension and quench area, were used to determine the effectiveness of the different random interpolyamides in bringing the process toward conditions comparable to those observed in the absence of pigment.

Comonomers employed in this series included caprolactam (A), sodium 5-sulfoisophthalate (B), isophthalic acid (C), 2-methyl pentamethylene diamine (D), dodecanedioic acid (E), glutaric acid (F), and m-xylene diamine (G). The level of each additive, in wt %, in the final polymer is given in Table C in the third column in parentheses for these modified polymers. In making the control polymers, for those having an acid comonomer (Controls 10, 12, and 13) a balancing amount of hexamethylene diamine was present, while for those having a diamine comonomer (Controls 11 and 14) a balancing amount of adipic acid was present. Example 7 was balanced with adipic acid to obtain the desired weight percentages of additives, while no nylon 6,6-forming monomer was required to balance the additives present in Examples 6 and 8.

From these results, it can be concluded that different comonomers have different effectiveness in terms of reducing the force required to draw and for reducing the quench area. The draw tension effectiveness of the various copolymer controls ranged from about 3% to about 11% (Controls 10-14). The effectiveness of these comonomers is substantially improved when more than one is used to make a random terpolyamide or multipolyamide, as indicated by the draw tension effectiveness results and the calculated synergism values for Examples 6-9. The multipolyamide of Example 9, formed by polymerizing hexamethylene adipamide forming monomers with caprolactam, sodium 5-sulfoisophthalate (balanced with hexamethylene diamine), 2-methyl pentamethylene diamine balanced with dodecanedioic acid, together with a small amount of the branching agent tris(amino ethyl)amine (TREN), the latter being balanced with adipic acid, was particularly effective. Looking at this particular multipolymer, it is interesting to note that most of the comonomers used have very low effectiveness individually (3-7% for A, D, and E). (The sodium 5-sulfoisophthalate additive, which is relatively effective individually, is employed at a very low level of 0.4 wt %.) This Example clearly demonstrates that even by using comonomers with low individual effectiveness, the effectiveness of a polymer can be substantially improved by balancing with a random multipolymer system. It is expected that the effectiveness would have been even greater if the branching agent TREN had not been used. It would therefore appear that a particularly effective random interpolyamide useful for achieving the process improvements of this invention involves the use of the multi-polymer formed by polymerizing a composition comprised of hexamethylene adipamide-forming monomers with caprolactam, 5-sulfoisophthalic acid or a salt thereof, 2-methyl pentamethylene diamine, and dodecanedioic acid, the random multi-polyamide so produced having 1-3 weight percent polymerized units of caprolactam, at least 0.4 weight percent polymerized units of 5-sulfoisophthalic acid or a salt thereof, 1-2 weight percent polymerized units of 2-methyl pentamethylene diamine, and 1-3 weight percent polymerized units of dodecanedioic acid.

Tenacity (gpd) and % elongation of these pigmented fibers were also measured. Column 9 in Table C gives values for the product of Tenacity and the square root of Elongation for the fibers of this series. This parameter is thought to be particularly useful in defining the overall drawability of the fiber. It is apparent that when the pigment is added to nylon 6,6 homopolymer, $T \times E^{\frac{1}{2}}$ reduces by about 30% (Controls 8 and 9). This loss in properties is slightly reduced with the copolymer systems of Controls 3-7, but is significantly reduced for the random terpolymers of Examples 6-8, and virtually eliminated for the multipolymer of Example 9. The improvement in $T \times E^{\frac{1}{2}}$ results in a stronger fiber as well as one which can be made with fewer process breaks.

derived based on the assumption of a linear relation between process parameters or product properties of the other fibers in this series.

From these and the preceeding Examples, it may be observed that:

Pigment Effect: Irrespective of fiber cross-section, tri-lobal or hollow filament, pigment deteriorates fiber

TABLE C

| Item | Pigment Concentrate | Polymer (wt % additives) | Quench Area (sq yds/min) | Draw Tension (gpd) | % DTE Actual | % DTE Expected | Synergism (%) | Tenacity × sq. rt. (Elong.) |
|---|---|---|---|---|---|---|---|---|
| Control 8 | None | 6, 6 | 739.7 | 0.875 | | | | 21.7 |
| Control 9 | Dark Plum | 6, 6 | 970.8 | 1.487 | | | | 14.0-15.2* |
| Control 10 | Dark Plum | 6, 6/C(2.95) | 915.9 | 1.290 | 10.9 | | | 17.0 |
| Control 11 | Dark Plum | 6, 6/D(2.6) | 943.5 | 1.438 | 3 | | | 17.8 |
| Control 12 | Dark Plum | 6, 6/E(2.95) | 930.9 | 1.369 | 6.5 | | | 16.4 |
| Control 13 | Dark Plum | 6, 6/F(3.0) | 851.4 | 1.307 | 9.8 | | | 16.5 |
| Control 14 | Dark Plum | 6, 6/G(2.5) | 856.6 | 1.332 | 9.4 | | | 17.7 |
| Example 6 | Dark Plum | 6, 6/C(2.95)/D(2.06) | 813.1 | 1.056 | 14 | 7.7 | 81.8 | 19.4 |
| Example 7 | Dark Plum | 6, 6/D(2.3)/E(2.7) | 870.7 | 1.287 | 6.5 | 4.9 | 32.6 | 18.6 |
| Example 8 | Dark Plum | 6, 6/C(2.6)/G(2.4) | 821.1 | 1.097 | 12.7 | 10.2 | 24.5 | 20.4 |
| Example 9 | Dark Plum | A(2.0)/B(0.4)/D(1.8)/E(1.95)/H(0.75) | 794.3 | 0.966 | 15.5 | 7.07 | 119.7 | 21.4 |

*Significant variation in numbers due to high break level
Additives
A = Caprolactam
B = Sodium 5-sulfoisophthalate
C = Isophthalic Acid
D = 2-Methyl Pentamethylene Diamine
E = Dodecanedioic Acid
F = Glutaric Acid
G = m-Xylene Diamine
H = Tris(Amino Ethyl) Amine

EXAMPLES 10-14

A series of experiments was also performed with random interpolyamides having the compositions described in Table D. Controls 17 and 18 were prepared using a salt of sodium 5-sulfoisophthalate and a balancing equimolar amount of hexamethylene diamine. The Examples were prepared from a combination of hexamethylene adipate salt and the salt formed from isophthalic acid and 2-pentamethylene diamine using the condensation polymerization and solid phase polymerization methods described earlier. Two different pigment concentrates having the compositions and addition rates shown on Table A were used. The pigment addition was again at the entrance of the screw melter.

The polymer and pigments were then extruded into trilobal filaments with a modification ratio of 2.3 to form a 18 dpf, 1235 denier product using a coupled spin-draw process at a draw ratio of 265%. Draw tension was measured on-line for each fiber. In addition, a visual inspection under a flashlight in the draw zone was performed to count broken filaments in a three minute time period. This procedure was repeated several times to get an average number of broken filaments reported in Column 7.

The values reported for Control 15 in Table D are actually the average values for non-pigmented yarn for four different polymers, specifically those used in Control 17/18, Examples 10/12, 11/14, and 13. The values reported for Control 16 were not measured but are processing performance. Pigment also drastically reduces the fiber physical properties (tenacity and elongation) which may reduce its usefulness for various textile, carpet, or industrial end uses.

Polymer Effect: It is observed from Examples 10-14 that increasing the weight percentage of a specific pair of different recurring amide units has a significant effect on improved process performance. With polymer containing 1.5% polymerized units of isophthalic acid and 1.0% polymerized units of 2-methyl pentamethylene diamine, the spinning process was inoperable, whereas with polymer containing 4.5% and 3% respectively of the same two additives (Example 14), the spinning process operated without any difficulties. This particular random interpolyamide appears to be of particular interest since the spinning process approached that of non-pigmented nylon in quench area, draw tension, and average number of broken filaments. Also, its physical properties are significantly better than Controls 17 and 18, indicating a superior fiber.

The fibers prepared during these experiments were also stain tested, using the staining test method described in Anton et al. Both Controls 17 and 18 were non-stainable, whereas the fibers of Examples 10-14 were readily stainable. Hence, this random interpolymer is particularly useful for making pigmented, stainable fiber without encountering major process difficulties. Such fibers are useful in over-printing applications or can be further dyed to achieve unique coloration effects.

TABLE D

| Item | Pigment Concentrate | Polymer (wt % additives) | Quench Area (sq yds/min) | Draw Tension (gpd) | Tenacity × sq. root (Elong.) | Average No. of Broken Filaments |
|---|---|---|---|---|---|---|
| Control 15 | None | | 499.2 | 0.829 | 22 | 0.1 |
| Control 16 | Dk. Plum or Electric Blue 6, 6 | | 638.9 | 1.525 | 11.2-12.8 | >100 |
| Control 17 | Dark Plum | 6, 6/B(2.0) | 574.8 | 1.253 | 15.29 | 4.5 |
| Example 10 | Dark Plum | 6, 6/C(1.5)/D(1.0) | 604.5 | 1.245 | ** | >15 |

TABLE D-continued

| Item | Pigment Concentrate | Polymer (wt % additives) | Quench Area (sq yds/min) | Draw Tension (gpd) | Tenacity × sq. root (Elong.) | Average No. of Broken Filaments |
| --- | --- | --- | --- | --- | --- | --- |
| Example 11 | Dark Plum | 6, 6/C(4.5)/D(3.0) | 501.8 | 0.839 | 20.4 | 0.15 |
| Control 18 | Electric Blue | 6, 6/B(2.0) | 540.8 | 1.004 | 18.27 | 4.5 |
| Example 12 | Electric Blue | 6, 6/C(1.5)/D(1.0) | 583.3 | 1.249 | ** | >15 |
| Example 13 | Electric Blue | 6, 6/C(3.0)/D(2.0) | 562.6 | 1 | 16.74 | 7.1 |
| Example 14 | Electric Blue | 6, 6/C(4.5)/D(3.0) | 514.7 | 0.814 | 20.9 | 0 |

*Estimated based on assumption of linear relationship with polymer additive
**Could not be wound-up due to high number of breaks
Additives
B = Sodium 5-sulfoisophthalate
C = Isophthalic Acid
D = 2-Methyl Pentamethylene Diamine

EXAMPLES 15-20

The polymers of this series were prepared in a bench autoclave. These modified nylon 6,6 polymers were each prepared by taking a weighed amount of hexamethylene adipate salt and by adding weighed amounts of the various comonomers to the autoclave vessel. As in prior Examples, the balance of $NH_2$/COOH ends was maintained by adding equimolar amounts of hexamethylene diamine to balance the end groups of sodium 5-sulfoisophthalate. Other additives, such as antifoam agents were also added to the autoclave. The vessel was then sealed and purged with nitrogen 10 times to remove oxygen.

The heat was then turned on and the water evaporation process was started. Initially, the vent valve was kept closed to build the pressure to 250 psi, and the vapor vent valve was kept in automatic control to maintain the pressure at 250 psi until the polymer temperature in the autoclave reached approximately 285° C. At this time, the vapor vent valve was opened to reduce the pressure over the next 90 minutes from 250 psi to 0 psi while maintaining polymer temperature. At the end of the pressure reduction cycle, nitrogen purge was applied to the autoclave at a low rate to remove moisture, and hence, to force the equilibrium to a higher degree of polymerization. After 30 minutes of nitrogen sweep, higher nitrogen pressure was applied, and the polymer was forced through an extrusion nozzle to form ribbons. The ribbons were quenched with water and cut into pieces to produce flaked polymer for subsequent use in the spinning and drawing process to form fiber.

The polymer samples produced in this manner were dried and further polymerized in an oven under nitrogen purge at 18" of $H_2O$ pressure. For this step of solid phase polymerization, the oven was at room temperature when the sample was put in the oven. Then, the temperature of the oven was raised slowly to 170° C. in 2.5 to 3.0 hrs., and held at this temperature to obtain the desired relative viscosity. The time was variable depending on the initial polymer RV and also the type of additive. At the end of the constant temperature period, the oven was turned off and cooled down before removing the flake from the oven. The final RV of the flake was in the range of 51-57.

These polymer samples were tested for use in making high tenacity fibers suitable for industrial end-uses. The pigment used for this series is described in Table A as mint. The high tenacity fiber samples of this series were produced on bench scale equipment where pigment and the pre-conditioned polymer flake were premixed and supplied to a screw melter. The flake-pigment mixture was then melted, extruded through a round hole spinneret to form a round cross-section, 7 filament, 45 dtex yarn. The yarn was quenched by controlled temperature air, and a primary finish was applied. The filament bundle was then passed over change of direction rolls driven by a variable speed motor. Subsequently, the filament bundle is passed over two sets of draw rolls, again driven by variable speed motors. The change of direction (feed) rolls were heated to about 50° C. to increase the temperature of the yarn during drawing, and the yarn is passed over a three meter long plate heated to about 200° C. in the second draw zone to aid drawing. The fiber produced by this process is then wound up as a package.

The total mechanical draw applied to the fiber can be varied by adjusting the draw roll speeds. For each flake type, the samples were produced at three different mechanical draw ratios, 4.4×, 4.8×, and 5.2×; 4.8 draw ratio is considered to be nominal. Tenacity was measured on each sample and plotted against the mechanical draw ratio for each flake type to determine the draw ratio required to obtain 8.0 gpd tenacity as reported in Column 9 of Table E.

In addition, the draw ratio was increased to a point where the filament bundle breaks due to excessive stress. This procedure was repeated several times (at least 4), and the average consistent value of draw ratio at break was determined (Column 7, Table E). Since some fiber orientation occurs in the chimney due to several factors such as air drag and snub, there is a predraw of the fiber before the mechanical drawing step. By measuring the birefringence (Column 5) of the samples collected on the change of direction roll before the first stage draw, one can determine the predraw as reported in Column 6.

The drawability (Column 8) is the product of predraw (Column 6) and draw ratio at break (Column 7). Similarly, total draw for 8 gpd tenacity (Column 10) is also a product of Column 5 and Column 9. The residual draw (Column 11) is the difference between the drawability and the total draw for 8 gpd tenacity. This parameter is of particular importance in evaluating different polymers for fiber manufacturing because it indicates the operating window between the maximum draw a fiber can take and the process setting at which one will obtain the desired property. As the value of the residual draw increases, the process breaks reduce since one will be operating at a much lower draw ratio to obtain the desired properties.

Force to draw (draw tension) was measured between the first stage and second stage draw roll at 4.8× draw ratio and is reported in Column 4. Except for Control 19, the mint pigment concentrate described in Table A was used with all the polymers. It is observed that when mint pigment is added to nylon 6,6 (Control 20 vs. Control 19), the force to draw and pre-draw increase significantly. On the other hand, the drawability reduces substantially and requires higher total draw to obtain desired 8.0 gpd tenacity resulting in a lower residual draw. It was also observed that the process was inoperable at 5.2× mechanical draw ratio due to extremely high break level. No fiber sample could be collected. This confirms that the residual drawability is a good predictor of the polymer performance. All these observations are consistent with the previous observations for producing moderate tenacity yarns (~3.0 gpd), i.e., pigment addition increases draw tension, produces weaker yarn (poorer tensile properties) at a given draw ratio, and significantly increases process breaks.

By introducing at least two different recurring amide-forming moieties while manufacturing pigmented high teneacity nylon 6,6, it is observed from Examples 15-20 that while spinning nylon 6,6 homopolymer and mint pigment is discontinuous due to high breaks, it can easily be made operable by using modified random interpolyamides having two different recurring amide-forming moieties other than those which form nylon 6,6. Moreover, the use of these random interpolyamides permits sufficient orientation to achieve tenacities of 7.5 or even 8.0 gpd in these pigmented fibers.

with adipic acid were added to the caprolactam solution in the autoclave. Polymerization conditions for both polymers were standard, including the conditioning process.

Both these polymers were spun under identical conditions on bench scale equipment with and without pigments. The homopolymer of poly(e-caproamide) could not be drawn even to 4.4× draw ratio with or without pigment. However, the terpolymer having polymerized units of caprolactam (major component), sodium 5-sulfoisophthalate (3.0%), and 2-methyl pentamethylene diamine could be spun and drawn to 5.2× draw ratio. Also, the drawability is significantly higher for this terpolymer with or without pigment (~1.3× higher draw). Hence, it is shown that the terpolymer compositions are not only useful for improved processing of pigmented nylon 6,6 fibers, but are also useful for making pigmented 6 nylon fibers. Similar improvements can be expected for other nylons to, in general, improve spinning performance and/or fiber properties.

TABLE F

| Item | Polymer (wt % additives) | Pigment Concentrate | Draw Tension (g) | Birefringence | Pre-draw | Draw Ratio at Break | Drawability | Tenacity at 4.8 Draw Ratio |
|---|---|---|---|---|---|---|---|---|
| Control 25 | 6 Nylon | None | 61 | 0.00236 | 1.054 | 4.4 | 4.64 | NA |
| Control 26 | 6 Nylon | Mint | 75 | 0.00218 | 1.049 | <4.56 | <4.56 | NA |
| Control 27 | 6/B(3)/D(3) | None | 53 | 0.00138 | 1.031 | 5.75 | 5.92 | 4.95 |
| Example 21 | 6/B(3)/D(3) | Mint | 54 | 0.00184 | 1.042 | 5.65 | 5.88 | 4.79 |

Additives
B = Sodium 5-sulfoisophthalate
D = 2-Methyl Pentamethylene Diamine

EXAMPLES 22-23

The polymer described earlier in Example 15 was spun and drawn on a two position development machine, which is a prototype of a commercial machine. The polymer, prepared by the process described previously, contained 95 weight percent nylon 6,6 units, 2 weight percent polymerized units of sodium 5-sulfoisophthalate, and 3 weight percent polymerized units of caprolactam, as well as 66 ppm copper added as cupric acetate. This polymer was conditioned to about 60 RV by solid phase polymerization, co-fed with the black pigment described in Table A, to a screw melter where it was melted and extruded through a round capillary spinneret to form filaments. These filaments

TABLE E

| Item | Polymer (wt % additives) | Pigment Concentrate | Draw Tension (g) | Birefringence | Pre-draw | Draw Ratio at Break | Drawability | Draw Ratio for 8 gpd Tenacity | Total Draw for 8 gpd Tenacity | Residual Draw |
|---|---|---|---|---|---|---|---|---|---|---|
| Control 19 | 6, 6 | None | 81 | 0.00253 | 1.085 | 6.00 | 6.51 | 5.00 | 5.43 | 1.09 |
| Control 20 | 6, 6 | Mint | 87 | 0.00415 | 1.098 | 5.55 | 6.09 | 5.09 | 5.59 | 0.51 |
| Control 21 | 6, 6/B(3.0) | Mint | 68 | 0.00417 | 1.097 | 6.10 | 6.69 | 4.99 | 5.47 | 1.22 |
| Control 22 | 6, 6/B(4.0) | Mint | 71 | 0.00282 | 1.065 | 6.60 | 7.03 | 5.45 | 5.80 | 1.22 |
| Example 15 | 6, 6/A(3.0)/B(2.0) | Mint | 68 | 0.00417 | 1.097 | 6.30 | 6.91 | 4.95 | 5.43 | 1.48 |
| Example 16 | 6, 6/C(1.5)/D(1.0) | Mint | 76 | 0.00247 | 1.086 | 6.30 | 6.84 | 5.03 | 5.46 | 1.38 |
| Example 17 | 6, 6/C(3.0)/D(2.0) | Mint | 70 | 0.00268 | 1.061 | 6.40 | 6.79 | 5.13 | 5.44 | 1.35 |
| Example 18 | 6, 6/C(4.5)/D(3.0) | Mint | 66 | 0.00189 | 1.047 | 6.85 | 7.17 | 5.46 | 5.72 | 1.46 |
| Example 19 | 6, 6/B(2.0)/C(1.0) | Mint | 72 | 0.00268 | 1.061 | 5.80 | 6.15 | 4.87 | 5.17 | 0.99 |
| Control 23 | 6, 6/I(3.0) | Mint | 80 | 0.00176 | 1.039 | 6.17 | 6.41 | 5.56 | 5.78 | 0.63 |
| Control 24 | 6, 6/J(3.0) | Mint | 76 | 0.00139 | 1.031 | 6.07 | 6.26 | 5.35 | 5.52 | 0.74 |
| Example 20 | 6, 6/E(3.0)/I(3.0) | Mint | 70 | 0.00228 | 1.052 | 6.10 | 6.41 | 5.36 | 5.64 | 0.77 |

Additives
A = Caprolactam
B = Sodium 5-sulfoisophthalate
C = Isophthalic Acid
D = 2-Methyl Pentamethylene Diamine
E = Dodecanedioic Acid
I = Dodecane Diamine
J = Lauryllactam

EXAMPLE 21

Polymers for the series described in Table F, were also prepared in the bench scale autoclave described earlier. For the nylon 6 homopolymer of Controls 25 and 26 a 70% caprolactam solution in water was charged to the autoclave with other additives and then polymerized by using the process described earlier but slightly modified to account for the lower melting point of poly(e-caproamide) for Control 25. For the polymer of Control 27 and Example 21, sodium 5-sulfoisophthalate and 2-methyl pentamethylene diamine balanced were then quenched by cross-flow air, drawn using the two-stage draw process described in U.S. Pat. No. 3,311,691 (Good). The product was ~6 dtex/filament with a total dtex of 235.

For Controls 23–25 and Example 22 the quench point of the filaments in the chimney, measured in inches from the spinneret, is the point at which the filaments appeared to be solid when touched with an object, such a as screw driver. The draw force or draw tension required to draw the fiber in the second stage was also measured. Physical properties of the fiber on the final package were also measured, including specifically tenacity and elongation. Several packages were measured, and the numbers reported herein are the average values. Also, the average time between each break for different items was estimated. The results are given in Table G. The following observations can be made:

When pigment is added to 6,6 nylon, Control 23 vs. Control 25, the force to draw increases by about 86%, tenacity reduces by 17%, tenacity multiplied by the square root of elongation reduces by 18%, and the process breaks increase to the point that the process becomes inoperable.

When the random modified polymer of Example 22 is used with pigment, both the product and the process are comparable to Controls 23 and 24. It is surprising that even with a lower draw ratio, 0.5 gpd higher tenacity is obtained when compared with homopolymer (Control 25).

The results of Examples 22 and 23 as compared to Control 25 are particularly impressive as these yarns were spun on commercial spinning equipment and therefore demonstrate that these modified polyamides can be used to produce high tenacity fibers under commercial conditions. It can be observed from Example 23 that at a draw ratio of 4.8 black pigmented nylon yarn having a tenacity of 8.1 gpd and a modulus of 35.1 can be made, and from Example 22 that at the lower 4.59 draw ratio, a tenacity value of 7.49 and a modulus of 31.7 is achieved.

EXAMPLES 24–25

Examples 24–25, the results of which are shown in Table H, illustrate the formation of block polymers by using conventional pigment concentrates, but co-feeding to the screw melter a different polyamide having isophthalic, terephthalic, or 2-methyl pentamethylenediamine moieties which, following transamidation, form a block with the nylon 6,6 copolymer.

In this series a 2.0 % sodium 5-sulfoisophthalate copolymer of nylon 6,6 made as previously described was mixed with a Phthalo Blue pigment (0.5 wt %) dispersed in a concentrate of nylon 6 (1.0 wt %) and 46%/34%/20% nylon 6/6,6/6,10 terpolymer (0.5 wt %) in the screw melter, where it was melted and pumped through a transfer line to spinning packs. In Example 24 9.75 weight percent of an isophthalic acid/-terephthalic acid/hexamethylene diamine copolyamide (number average molecular weight 8900) having polymerized moieties of isophthalic acid (4.0 weight percent) and of terephthalic acid (1.7 weight percent), these moieties constituting 5.7 wt % on weight of the fiber was co-fed to the screw melter. For Example 25 a 9.75 weight percent polymer of isophthalic acid (5.75 weight percent) and 2-methyl pentamethylenediamine (4.0 weight percent), the polymer having a number average molecular weight of 12,700, was co-fed to the melter. In each case the polymer compositions were held at 287° C. for about 3–4 minutes, and spun into an 18 dpf trilobal filament (2.3 modification ratio), 1235 denier yarn using a coupled process and a draw ratio of 265%. As described previously, the draw tension was measured for these examples and the lower draw tension as compared to Control 26 indicates improved spinning performance.

TABLE H

| Item | Polymer (wt % additives) | Polymers Added via Pigment (wt % of Fiber) | Moieties Added at Flake Cofed to Screw Melter (wt % of Fiber) | Draw Tension (gpd) |
| --- | --- | --- | --- | --- |
| Control 26 | 6, 6/B(2.0) | M(1.0)/N(0.5) | None | 1.185 |
| Example 24 | 6, 6/B(2.0) | M(1.0)/N(0.5) | C(4.0)/O(1.7) | 0.884 |
| Example 25 | 6, 6/B(2.0) | M(1.0)/N(0.5) | C(5.75)/D(4.0) | 0.803 |

Additives
B = Sodium 5-sulfoisophthalate
C = Isophthalic Acid
D = 2-Methyl Pentamethylene Diamine
M = Nylon 6
N = Nylon 6/6, 6/6, 10 (46%/34%/20%) terpolymer
O = Terephthalic Acid

EXAMPLE 26

This Example demonstrates formation of a block polyamide with a block forming moiety in the pigment concentrate.

TABLE G

| Item | Polymer (wt % additives) | Pigment Concentrate | Quench Point (inches) | Total Draw Ratio | Draw Force (g/dtex) | Tenacity (gpd) | Tenacity × sq. root Elong. | Time btwn breaks (minutes) | Modulus (gpd) | Elongation % | Brk Strength (Newtons) |
| --- | --- | --- | --- | --- | --- | --- | --- | --- | --- | --- | --- |
| Control 23 | 6, 6 | None | 14 | 4.81 | 1.575 | 8.4 | 39.4 | 300 | 37.8 | 22 | 17.5 |
| Control 24 | 6, 6/A(3.0)/B(2.0) | None | 20 | 4.71 | 1.702 | 7.9 | 40.6 | 300 | 33.7 | 26.4 | 16.4 |
| Control 25 | 6, 6 | Black | 8 | 4.81 | 2.872 | 7.0 | 32.1 | 16–17 | 26.1 | 21 | 14.1 |
| Example 22 | 6, 6/A(3.0)/B(2.0) | Black | 14 | 4.59 | 1.711 | 7.5 | 37.9 | 295 | 31.7 | 25.5 | 15.5 |
| Example 23 | 6, 6/A(3.0)/B(2.0) | Black | 14 | 4.8 | N/A | 8.1 | 38.9 | N/A | 35.1 | 23.1 | 16.8 |

Additives
A = Caprolactam
B = Sodium 5-sulfoisophthalate

A pigment concentrate containing 25% Phthalo Blue (PB15:2) pigment, 25% of poly(N,N'-dibutylhexamethylene dodecamide), made by polymerizing butylated hexamethylenediamine and dodecanedioic acid, and 50% nylon 6,6/6,10 (46%/34%/20%) terpolymer was added through an additive feeder at the throat of a twin screw extruder and mixed with a 2% sodium 5-sulfoisophthalate random copolymer of nylon 6,6. The poly(N,N'-dibutylhexamethylene dodecamide) had a number average molecular weight of 2400. The mixed polymer/concentrate was then melted, heated to 285° C., held for 3-4 minutes, spun and drawn at a 2.6 draw ratio using a coupled process into a 1225 denier (136 filaments), 2.3 modification ratio trilobal cross-section yarn. Yarn speed was 1000 ypm. Rate of pigment concentrate addition was adjusted such that yarn contained (by weight) 0.35 wt % pigment and hence 0.35% of the N,N'-dibutylhexamethylene dodecamide polyamide, which at the 285° C. spinning temperature can be expected to have formed blocks with the copolymer which have both the N,N'-dibutylhexamethylene diamino and the dodecanedioic moieties. This yarn was spun without breaks for about two hours. A control yarn made in the same manner as the above example except from a pigment concentrate containing only 25% of the same Phthalo Blue pigment and 75% nylon 6,6/6,10 terpolymer would not spin, even at only 0.10% pigments in yarn, without a significant number of spinning breaks.

EXAMPLE 27

In another test, a dark plum pigment concentrate containing 25% dark plum pigment (a mixture of Channel Black (PBK-7), Phthalo Blue (PB-15:2) and Perylene Red (PR-159) pigments), 25% of the same poly(N,N'-dibutylhexamethylene dodecamide) used in the previous example, and 50% nylon 6/6,6/6,10 (46%/34%/20%) terpolymer was added through an additive feeder at the throat of a twin screw extruder and mixed with nylon pellets consisting of a random interpolyamide of (by weight) 98% nylon 6,6 and 2% sodium 5-sulfoisophthalate. The mixed polymer/concentrate was then melted, heated to 285° C., held for 3-4 minutes, spun, and drawn at a 2.75 draw ratio in a coupled process to form a 1225 denier (128 filaments), square hollow filament cross-section yarn. Yarn speed was approximately 869 ypm. Rate of pigment concentrate addition was adjusted such that the yarn contained (by weight) 0.37% pigment and hence 0.37% of the N,N'-dibutylhexamethylene dodecamide polyamide which at the 285° C. spinning temperature can be expected to have formed blocks with the copolymer which have both the N,N'-dibutylhexamethylene diamino and dodecanedioic moieties. This yarn spun well without breaks for about two hours, and the draw tension measured was about 1200 gms or about 0.980 gpd. A control yarn made in the same manner except using a pigment concentrate containing only 28.4% dark plum pigments and 71.6% nylon 6/6,6/6,10 terpolymer would not spin well, and the draw tension measured was about 1450 gms or about 1.18 gpd.

We claim:

1. In a process for melt-spinning a pigmented nylon fiber by the steps of forming a homogenous melt blend of a polyamide and a colored pigment, spinning the blend to form a fiber, and applying a draw tension to the fiber to draw it and thereby increase its orientation, the improvement for decreasing the draw tension necessary to achieve a predetermined degree of draw wherein the polyamide is a random interpolyamide or a block polyamide having at least 80 percent by weight hexamethylene adipamide units and at least two different recurring difunctional amide-forming moieties other than those which form hexamethylene adipamide, each of said different recurring amide-forming moieties being present in an amount of 0.25 to 10 weight percent of the polyamide and wherein the different amide-forming moieties constituting part of a block in any block polyamide are selected from the group consisting of isophthalic, terephthalic, dodecanedioic, 2-methyl pentamethylenediamino, and N, N'-dibutyl hexamethylenediamino.

2. The process of claim 1 wherein the polyamide is a random interpolyamide.

3. The process of claim 2 wherein the different recurring amide-forming moieties of the interpolyamide are each present in an amount of 0.4 to 7.5 weight percent of the polyamide.

4. The process of claim 3 wherein the interpolyamide is formed by polymerizing hexamethylene adipamide forming monomers, caprolactam and either 5-sulfoisophthalic acid or a salt thereof.

5. The process of claim 4 wherein the interpolyamide has about 2-4 weight percent polymerized units of caprolactam and about 1-3 weight percent polymerized units of the sodium salt of 5-sulfoisophthalic acid.

6. The process of claim 3 wherein the interpolyamide is formed by polymerizing hexamethylene adipamide forming monomers, caprolactam and isophthalic acid.

7. The process of claim 3 wherein the interpolyamide is formed by polymerizing hexamethylene adipamide forming monomers, isophthalic acid and 5-sulfoisophthalic acid or a salt thereof.

8. The process of claim 3 wherein the interpolyamide is formed by polymerizing hexamethylene adipamide forming monomers, isophthalic acid and 2-methyl pentamethylene diamine.

9. The process of claim 3 wherein the interpolyamide is formed by polymerizing hexamethylene adipamide forming monomers, dodecanedioic acid and 2-methyl pentamethylene diamine.

10. The process of claim 3 wherein the interpolyamide is formed by polymerizing hexamethylene adipamide forming monomers, isophthalic acid and m-xylene diamine.

11. The process of claim 3 wherein the interpolyamide is formed by polymerizing hexamethylene adipamide forming monomers, caprolactam, the sodium salt of 5-sulfoisophthalic acid, 2-methyl pentamethylene diamine, and dodecanedioic acid.

12. The process of claim 3 wherein the interpolyamide is formed by polymerizing hexamethylene adipamide forming monomers, dodecanedioic acid and dodecane diamine.

13. The process of claim 1 wherein the polyamide is a block polyamide.

14. The process of claim 13 wherein the block polyamide is formed by melt-blending a base polymer selected from the group consisting of poly(hexamethylene adipamide) and copolymers of hexamethylene adipamide with the polymer formed from isophthalic acid, terephthalic acid and hexamethylene diamine.

15. The process of claim 14 wherein the colored pigment used to form the melt-blend is dispersed in a pigment concentrate, said concentrate also containing the polymer formed from isophthalic acid, terephthalic acid and hexamethylene diamine.

16. The process of claim 13 wherein the block polyamide is formed by melt-blending a hexamethylene adipamide base polymer with the polymer formed from isophthalic acid and 2-methyl pentamethylene diamine.

17. The process of claim 13 wherein the block polyamide is formed by melt-blending a hexamethylene adipamide base polymer with poly(N,N'-dibutylhexamethylene dodecamide).

18. The process of claim 17 wherein the colored pigment used to form the melt-blend is dispersed in a pigment concentrate, said concentrate also containing the poly(N,N'-dibutylhexamethylene dodecamide).

19. The process of any one of claims 14–18 wherein the base polymer is a copolymer of hexamethylene adipamide and up to 4 weight percent of the sodium salt of 5- sulfoisophthalate.

* * * * *